Patented June 9, 1931

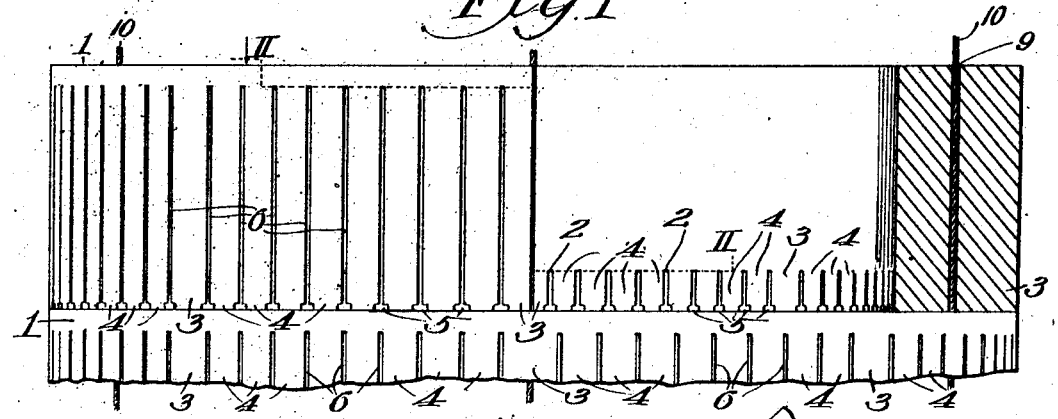

1,808,803

UNITED STATES PATENT OFFICE

GEORGE AUSTIN, OF KANSAS CITY, MISSOURI

WELL SCREEN

Application filed April 15, 1929. Serial No. 355,275.

This invention relates to concrete screens for wells of that class consisting of a series of circular sections superimposed upon each other from the bottom of the well to a point above the strata of the ground through which the flow of water occurs for charging the well, the screen members being strung upon cables or rods, and enclosed by a filter in the form of gravel, whereby sand shall be excluded from water passages provided in the members so that such passages shall not become clogged to the flow of water into the well.

There have been many well screens of the general type mentioned, and my object is to provide a construction in which the members are provided with slots or passages of novel form and adapted to provide for the greatest intake of water possible without impairing or weakening the strength and durability of the members.

With this general object in view the invention consists in certain novel and useful features of construction and combinations of parts as hereinafter described and claimed; and in order that it may be fully understood, reference is to be had to the accompanying drawings, in which:

Figure 1 is a view of two members of a well screen constructed and arranged in accordance with the invention, half of the upper member appearing in side elevation and the other half in central vertical section.

Figure 2 is a fragmentary irregular horizontal section on the line II—II of Figure 1, part of the underlying member appearing in plan view.

Figure 3 is an enlarged vertical section on the line III—III of Figure 2.

Figure 4 is a vertical section on the line IV—IV of Figure 3.

Figure 5 is a plan view of a part of a pattern used in the production of a screen member.

Figure 6 is a detail perspective of the pattern element disclosed by Figure 5.

Referring to the drawings in detail, 1 indicates one of the circular screen members of concrete or the like of a well casing, all of the members being identical in construction and sufficient in number as hereinbefore stated, to extend from the bottom of the well to a plane slightly above that of the strata of ground through which the water flows to the well hole.

The members are provided in their lower sides with a plurality of radial slots or passages 2 spaced relatively close together so as to provide between them a series of radial partitions 3 and 4, the latter being considerably narrower than the former. The partitions 3 are disposed in diametrically opposite pairs. It is desirable that the partitions 4 shall be as numerous as possible without making them so narrow as to impair the strength and durability of the member as a whole, as the water intake capacity of the well screen increases with the increase in the number of the slots or passages 2. To provide for maximum uninterrupted flow of water into the screen, the lower ends of slots or passages 2 are widened as at 5, by the formation of radial recesses in the lower ends of the partitions. The widening of said slots or passages correspondingly narrows the lower ends of the partitions 4 but leaves the latter wide enough for substantial contact with a prepared concrete base (not shown) or the underlying screen member, as the case may be. To still further increase the capacity of the screen, for receiving water at a rapid rate, the outer face of each member in the radial plane of each slot or passage 2, is provided with a vertical groove or passage 6, constituting an extension for each slot or passage 2, the extensions terminating close to the upper end of the member. By this arrangement, it is possible for water to start entering the screen for practically the full height of each member thereof, thus giving very great intake capacity for each member, and the water entering the extensions flows downwardly and inwardly, and not only tends to increase the rapidity of flow inwardly through the slots or passages 2, but by striking the direct flow through the latter at an angle, has a tendency to check and hence exclude any sand or fine gravel from the said slots or passages, which might in time, work its way with the water through the conventional enclosing gravel filter, not shown. In this connection it will be noted by reference to the drawings, and more particularly to Figures 5 and 6, that the passages 6 are of increasing cross sectional area in a downward direction, by virtue of the fact that the inner wall diverges downwardly with respect to the outer edge or mouth of the passage, and that the side walls diverge downwardly, and it will also be noted that the cross sectional area of the communicating passages 2 increases in an inward direction, by virtue of the fact that the side walls of such passages diverge inwardly and downwardly. It is also preferred that the inner wall or base wall of said radial passages shall diverge upwardly slightly with respect to the lower ends of the passages, as shown by Figure 3. The provision of the radial and vertical passages or channels of increasing cross sectional area in an inward and downward direction subserve a dual function, in that the passages or channels are less likely to be clogged by gravel or the like, then if of uniform cross sectional area, and the patterns by which the passages are formed can be withdrawn from the mold, when the sand is sufficiently set, without injury to the portions between or corners of the passages, this freedom of withdrawal of the patterns being especially important where the passages or channels are numerous and occupy a close relationship.

The type of pattern used for producing the passages 2 and 6 in the members are of angle form, the arm 7 being tapered upwardly at its sides and sloping upwardly and outwardly at its inner edge to form one of the passages 6, and the horizontal arm 8 projecting inwardly from the lower end of arm 7 and being of upwardly tapering form in cross section. Its upper edge also is designed to slope downwardly and outwardly slightly. The arm 8 is intended to produce the passage 2 in the member, the said passage, because of the form of the arm 8, increasing slightly in cross sectional area from its junction of the arm 7 with its inner extremity which will be flush with the inner face or wall of the member. In the production of each member there will of course be as many of these patterns as there are combined passages 2 and 6 produced in each member.

Four of the wider partitions 3 (of which there are preferably eight), are provided with vertical holes 9 for the reception of means whereby the members of the screen are maintained in proper registry. The preferred means for holding the screen members in proper concentric relationship is by cables 10 extending through the four holes 9 of all of the members, the cables being adapted to be knotted or otherwise secured against withdrawal below the lowest screen member, as common.

From the foregoing, taken in conjunction with the drawings, it will be apparent that I have produced a well screen of concrete or the like, having great water-intake capacity, and in which the screen members are of very simple, strong and durable construction, each member having, in the aggregate, a large number of points of contact with the underlying section, as distinguished from the types of well screens which have ordinarily about eight relatively small points of contact between members. In the latter construction the cables or connecting rods must be relied upon to a greater extent in preventing rotative or lateral shifting of the screen members tending to throw them out of alinement or register, than with the construction of this invention where the area of contact between adjacent screen members is relatively much greater, there being aproximately one-half of the area of the lower end of each screen member in frictional contact with the underlying screen member and hence a proportionate increase of frictional resistance to the shifting of one screen member upon another.

As the direction of flow of water into the screen has been explained, no general recapitulation thereof is deemed necessary, but I reserve the right to make such changes as properly fall within the spirit and scope of the appended claims.

I claim:

1. A well screen comprising a plurality of superimposed ring members, each provided with radial slots or passages in their lower ends, the slots or passages having upward extensions in the form of grooves in the exterior surface of the member; the lower end of the member being formed with spaced recesses individual to and communicating with and increasing the width of the lower ends of the respective slots or passages.

2. A well screen comprising a plurality of superimposed ring members, each provided with radial slots or passages in their lower ends, the slots or passages having upward extensions in the form of grooves, in the exterior surface of the member; the said extensions being of uniform width in the plane of the circumferential surface of the member, and of gradually increasing depth inwardly toward their lower ends and also of gradually increasing width from their upper to their lower ends; the lower end of the member being formed with spaced recesses individual to and communicating with and increasing the width of the lower ends of the respective slots or passages.

3. A well screen member of ring form having a smooth upper horizontal surface and a grooved horizontal under surface, and provided at spaced intervals with vertical passages in its outer surface which extend from the lower surface to within a relatively short distance of the upper surface, said passages being of inwardly expanding width, the member being also formed in its lower surface with radial passages in the vertical plane of and communicating at their outer ends with and narrower than the lower ends of the respective vertical passages; the lower ends of the radial passages and vertical passages being expanded laterally and providing relatively narrow radial spaced ribs on the bottom of the member corresponding in number to the vertical passages and providing conjointly for a large area of frictional contact with the smooth upper side of a similar underlying section when arranged in operative relation to the latter.

In testimony whereof I affix my signature.

GEORGE AUSTIN.